United States Patent
Quaranta et al.

(10) Patent No.: US 11,498,667 B2
(45) Date of Patent: Nov. 15, 2022

(54) ROTOR FOR A HOVER-CAPABLE AIRCRAFT AND METHOD FOR CONTAINMENT OF VIBRATIONS TRANSMITTED TO THE MAST OF A ROTOR OF A HOVER-CAPABLE AIRCRAFT

(71) Applicant: LEONARDO S.P.A., Rome (IT)

(72) Inventors: Giuseppe Quaranta, Samarate (IT); Federico Savorgnan, Samarate (IT); Pierangelo Masarati, Samarate (IT); Luigi Bottasso, Samarate (IT); Attilio Colombo, Samarate (IT)

(73) Assignee: LEONARDO S.P.A., Rome (IT)

( * ) Notice: Subject to any disclaimer, the term of this patent is extended or adjusted under 35 U.S.C. 154(b) by 302 days.

(21) Appl. No.: 16/754,270

(22) PCT Filed: Oct. 30, 2018

(86) PCT No.: PCT/IB2018/058499
§ 371 (c)(1),
(2) Date: Apr. 7, 2020

(87) PCT Pub. No.: WO2019/087070
PCT Pub. Date: May 9, 2019

(65) Prior Publication Data
US 2020/0298968 A1    Sep. 24, 2020

(30) Foreign Application Priority Data
Oct. 31, 2017   (EP) .................................... 17199478

(51) Int. Cl.
*B64C 27/00*    (2006.01)

(52) U.S. Cl.
CPC ...... *B64C 27/001* (2013.01); *B64C 2027/003* (2013.01)

(58) Field of Classification Search
CPC ........ B64C 2027/003; B64C 2027/005; B64C 27/001; B64C 11/008
See application file for complete search history.

(56) References Cited

U.S. PATENT DOCUMENTS

| 4,255,084 A | * | 3/1981 | Mouille ................ B64C 27/001 416/500 |
| 4,596,513 A | | 6/1986 | Carlson et al. |

(Continued)

FOREIGN PATENT DOCUMENTS

| FR | 2568647 A | * | 2/1986 | ........... B64C 27/001 |
| WO | WO 2008/155632 | | 12/2008 | |
| WO | WO 2017/145073 | | 8/2017 | |

*Primary Examiner* — Richard A Edgar
(74) *Attorney, Agent, or Firm* — Leason Ellis LLP

(57) ABSTRACT

A rotor for a hover-capable aircraft is described, comprising: a hub rotatable about an axis and, in turn, comprising a plurality of blades; a mast connectable to a drive member of the aircraft and operatively connected to the hub to drive the hub in rotation about the axis; and damping means for damping vibrations transmitted to the mast, which comprise a mass designed to oscillate in a plane transversal to the axis so as to contain flexural vibrations of the mast generated by rotation of the blades; the damping means also comprise elastic means having a desired stiffness along the axis and operatively connected to the mass to contain vibration of the mast along the axis.

27 Claims, 7 Drawing Sheets

(56) References Cited

U.S. PATENT DOCUMENTS

| | | |
|---|---|---|
| 5,647,726 A | 7/1997 | Sehgal et al. |
| 2010/0296930 A1 | 11/2010 | Girard et al. |
| 2010/0296931 A1 | 11/2010 | Girard |
| 2011/0268573 A1 | 11/2011 | Girard et al. |

* cited by examiner

ROTOR FOR A HOVER-CAPABLE AIRCRAFT AND METHOD FOR CONTAINMENT OF VIBRATIONS TRANSMITTED TO THE MAST OF A ROTOR OF A HOVER-CAPABLE AIRCRAFT

CROSS-REFERENCE TO RELATED APPLICATIONS

This application is a U.S. National Phase Application under 35 U.S.C. § 371 of International Patent Application No. PCT/IB2018/058499, filed on Oct. 30, 2018, which claims priority from European Patent Application No. 17199478.3 filed on Oct. 31, 2017, all of which are incorporated by reference, as if expressly set forth in their respective entireties herein.

TECHNICAL FIELD

The present invention relates to a rotor for a hover-capable aircraft, in particular to a rotor for a helicopter.

The present invention also relates to a method for the containment of vibrations transmitted to the mast of a rotor of a hover-capable aircraft.

BACKGROUND ART

Helicopters are known to basically comprise a fuselage, a main rotor positioned on the top of the fuselage and rotatable about its own axis, and a tail rotor located at the end of the fuselage.

In greater detail, the rotor, in turn, basically comprises a hub rotatable about the aforementioned axis and equipped with a plurality of blades radially fastened to and projecting from the aforesaid hub in a cantilevered fashion, and a mast that can be connected to a drive member and operatively connected to the hub to drive it in rotation.

In use, operation of the rotor causes the creation of high and low frequency vibrations. More specifically, low-frequency vibrations are generated by the wash separating from the blades and from the centre of the hub. This separation takes place at the centre of the hub and affects all the vertical and horizontal aerodynamic surfaces of the tail and the tail rotor.

In use, rotation of the blades at high angular speeds causes, the generation of further high-frequency vibrations, which are transmitted to the mast and, in consequence, to the fuselage, deteriorating comfort for the occupants inside the fuselage.

More specifically, the vibratory loads act on both the hub and the mast, both axially and orthogonally to the mast's axis of rotation.

Within the industry, it is known that the vibratory loads acting of the rotor have pulse rates of $N*\Omega$ and relative multiples thereof in the reference system integral with the fuselage, where $\Omega$ is the rotation speed of the mast and N represents the number of blades of the rotor.

In other words, the hub and the mast transfer pulses of the vibratory aerodynamic load acting in the plane of the blades onto the aforesaid pulses.

From the foregoing, there is a clearly felt need within the industry for limiting transmission from the mast to the fuselage of vibrations with the aforementioned pulse rate of $N*\Omega$ and relative multiples thereof.

For this purpose, there are known passive and active damping devices.

Passive damping devices basically comprise masses elastically suspended from the mast or the hub. The vibration of these suspended masses enables at least partially dissipating vibration on the mast and the hub.

Passive damping devices are normally tuned to a predetermined frequency value for which it desired to contain transmission to the mast.

Contrarily, active damping devices are fundamentally actuators that exert a sinusoidal damping force on the hub or on the mast, which counters the force generated by the vibrations.

An example of a passive damping device is illustrated in patent application PCTIB2008001594.

This patent application describes a damping device capable of curbing the generation and transmission of these vibrations to the mast of the rotor in a simple and inexpensive manner, without interfering with the aerodynamics and functioning of the rotor and/or the flow conveyor.

More specifically, the aforementioned damping device basically comprises:
- a mass housed inside the flow conveyor; and
- a rod, which is coaxially supported by the mast at its first axial end and is connected to the mass at its second axial end opposite to the first end.

More specifically, the axial stiffness of the rod is sufficiently high to constrain the mass in a substantially fixed position along the axis of the rotor.

Contrarily, the flexural stiffness of the rod is such as to allow vibration of the mass in a plane orthogonal to the axis of the rotor and with a frequency corresponding to $N*\Omega$ pulses and, therefore, such as to oppose the transmission of flexural vibrations generated by rotation of the hub and the blades to the mast.

If follows that the above-described damping device is only able to effectively counter the transmission of flexural vibrations to the mast in a plane substantially orthogonal to the axis of the rotor, the frequency of these vibrations being in the neighbourhood of a precise value determined by the flexural stiffness of the rod and the weight of the mass.

There is a clearly felt need within the industry to also efficiently counter the transmission of axial vibrations to the mast, i.e. those parallel to the axis of the mast. There is similarly felt need to have particularly compact and space-saving damping devices, in order to interfere with the layout of the rotor and mast as little as possible.

Finally, the damping devices are normally tuned to a nominal pulse rate of $N*\Omega$ before being installed inside the helicopter's rotor.

The effective value of the $N*\Omega$ pulses registered during effective operation of the rotor can be slightly different from this nominal value.

The need is therefore felt to be able to further adjust the tuning frequency of the damping devices to the actual pulse rate of the vibrations transmitted to the mast, once the damping device has been installed on the helicopter.

US-A-2010/296930, US-A-2011/268573, U.S. Pat. Nos. 5,647,726, 4,596,513 and US-A-2010/296931 disclose a rotor for a hover-capable aircraft according to the preamble of claim 1 and a method for the containment of vibrations transmitted to a mast of a rotor of an aircraft according to the preamble of claim 10.

DISCLOSURE OF INVENTION

The object of the present invention is to produce a rotor for an aircraft capable of hovering that enables satisfying at least one of the above-specified needs in a simple and inexpensive manner.

The aforesaid object is achieved by the present invention, in so far as it relates to a rotor for a hover-capable aircraft according to claim 1 or claim 23.

The present invention also relates to a method for the containment of vibrations transmitted to a mast of a rotor of an aircraft according to claim 24 or claim 27.

BRIEF DESCRIPTION OF THE DRAWINGS

For a better understanding of the present invention, two preferred embodiments are described hereinafter, purely by way of a non-limitative example and with reference to the accompanying drawings, in which.

BEST MODE FOR CARRYING OUT THE INVENTION

Figure 1:
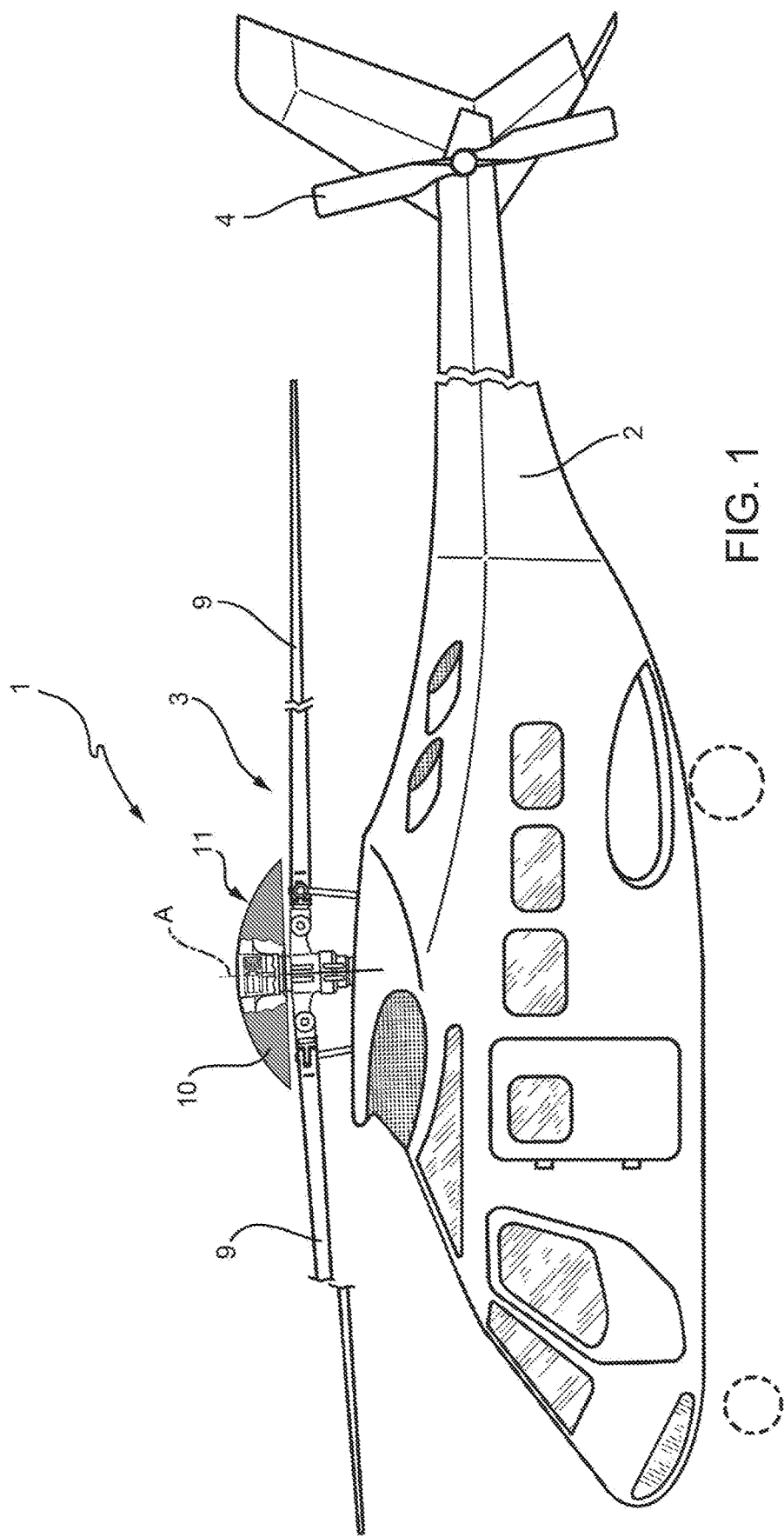
FIG. 1 is a side view of a helicopter comprising a rotor according to a first embodiment of the present invention.

Referring to FIG. 1, reference numeral 1 indicates a hover-capable aircraft, in particular a helicopter basically comprising a fuselage 2, a main rotor 3 positioned on the top of the fuselage 2 and rotating about an axis A, and a tail rotor 4 located at one end of the fuselage 2 and rotating about its own axis, transversal to axis A.

In greater detail, the rotor 3 comprises (FIG. 2) a hollow hub 5, with axis A, carrying a plurality of cantilever-mounted blades 9, which extend radially to axis A.

The rotor 3 also comprises a mast 6, rotatable about axis A, angularly integral with the hub 5, and coupled, in a manner not shown, with a drive member, for example a turbine, carried by the helicopter 1. In particular, the mast 6 is hollow.

More specifically (FIG. 3), the mast 6 is partly housed inside the hub 5 and is angularly integral with the hub 5 by means of a splined profile and a pair of wedges radially interposed between the mast 6 and the hub 5. In particular, the splined profile is axially interposed between the aforesaid wedges.

The main rotor 3 also comprises a flow conveyor 10 designed to guide the airflow generated by the rotation of the rotor 3 according to a predetermined path shaped so as to limit the vibrations generated by separation of the aforesaid flow from the tips of the blades 9 located on the opposite end to the hub 5.

In greater detail, the flow conveyor 10 is annular, extends around axis A and is located on the opposite side of the hub 5 with respect to the fuselage 2.

The flow conveyor 10 has a "hat-like" shape and is delimited by a pair of surfaces 11 and 12 axially facing each other; more specifically, surface 11 axially delimits the flow conveyor 10 on the opposite side to the hub 5, while surface 12 axially delimits the flow conveyor 10 on the side closest to the hub 5.

Surface 11 is continuous and extends, proceeding in a radial direction starting from axis A, at an axially decreasing distance from the hub 5.

Surface 12 has a first circular peripheral edge 13 and a second peripheral edge (not shown in FIG. 3), opposite to edge 13 and arranged radially outermost to peripheral edge 13. Furthermore, the second peripheral edge of surface 12 axially faces a peripheral edge of surface 11.

Surfaces 11 and 12 are shaped in such a way that that their axial distance decreases when proceeding in a radial direction starting from axis A.

More specifically, surface 12, when proceeding from edge 13 towards the second edge, first moves away from the hub 5 and then moves closer to the hub 5.

Surfaces 11 and 12 are connected to each other by a truncated cone-shaped tubular body 14, symmetrical with respect to axis A and having a lateral surface 8 extending between surfaces 11 and 12.

The rotor 3 further comprises a vibration-damping device 15. In particular, the device 15 is of the passive type and enables containing transmission to the mast 6 of both flexural vibrations in a plane orthogonal to axis A and axial vibrations along axis A, as shall become clear hereinafter in this description.

The device 15 basically comprises:
- a mass 17 operatively connected to the hub 5 and the mast 6 so as to counter the transmission of vibrations generated by the rotation of the blades 9; and
- an elastically deformable rod 16.

The rod 16 is supported by the mast 6 and connected to the mass 17, extending at least partly inside the mast 6, and stretching parallel to axis A.

More specifically, the flexural stiffness of the rod 16 in a plane orthogonal to axis A and the size of the mass 17 are such that the mass 17 vibrates, in use, with a predetermined frequency value, which is associated with the characteristic pulsation of the vibrations generated by rotation of the rotor 3 in the reference system integral with the fuselage 2. This value corresponds to a pulse rate of $N*\Omega$ where $\Omega$ is the rotation speed of the mast and N represents the number of blades of the rotor 3.

In other words, the rod 16 and the mass 17 form a first flexural tuned mass damper, tuned to the frequency of the vibrations generated by the rotor 3 and exerting a force on the mast 6 such as to counter the transmission of the aforementioned vibrations to the mast 6 and, therefore, to the helicopter 1.

It is important to stress that the rod 16 is configured so as to have high axial stiffness, such that it can be considered as not causing any axial movement of the mass 17.

The rotor 3 also comprises a cup-shaped body 20, with axis A, and angularly integral with the mast 6 and the rod 16 so as to connect the mast 6 and the rod 16 to each other.

More specifically, the cup-shaped body 20 has a tubular form, extending symmetrically about axis A and is radially external to the rod 16.

The cup-shaped body 20 comprises a main portion 22 encircled by the mast 6 and stretching parallel to axis A, and an annular head surface 21 lying on plane orthogonal to axis A.

The main portion 22 defines, on the end opposite to the head surface 21, a seat 23 engaged by an axial end 18 of the rod 16.

The rod 16 passes through the head surface 21, which is axially fastened, by means of a plurality of screws, onto a threaded ring nut 29 coupled to the mast 6.

The head surface 21 defines an axial end of the cup-shaped body 20 facing towards the flow conveyor 10, while the seat 23 is located at an axial end of the cup-shaped body 20 arranged at the opposite end to the head surface 21.

A threaded tie rod orthogonal to axis A also passes through the seat 23 and end 18.

Preferably, the cup-shaped body 20 is made of light alloy.

The rod 16 comprises a threaded end 19, opposite to end 18, and on which a nut 25 is screwed.

Finally, the rod 16 comprises an intermediate section between the ends 18 and 19, tapered from end 18 towards end 19, and passing through the head surface 21.

End 18 of the rod 16 is housed inside the mast 6.

Moreover, the rod 16 is completely housed inside the cylinder defined by the prolongation of the mast 6 towards the flow conveyor 10.

The mass 17 is housed inside the flow conveyor 10. In particular, the mass 17 is housed inside a bay 24 radially delimited by surface 8, axially open towards the hub 5, and axially closed on the opposite side to the hub 5 by the portion of surface 11 bounded by surface 8.

The device 15 comprises a plurality of springs 30 (FIGS. 2 to 5) operatively connected to the mass 17 and having a desired stiffness along axis A, so as to contain the transmission of axial vibrations to the mast 6.

In other words, the masses 17 and the springs 30 form a second tuned mass damper that oscillates along axis A, reducing the axial vibrations of the mast 6.

Preferably, the tuning frequency of the second mass damper, formed by the mass 17 and the springs 30, is equal to that of the first mass damper, formed by the rod 16 and the mass 17, and corresponds to a pulse rate of N*C).

More specifically, the springs 30 are interposed between the rod 16 and the mass 17.

Figure 5:
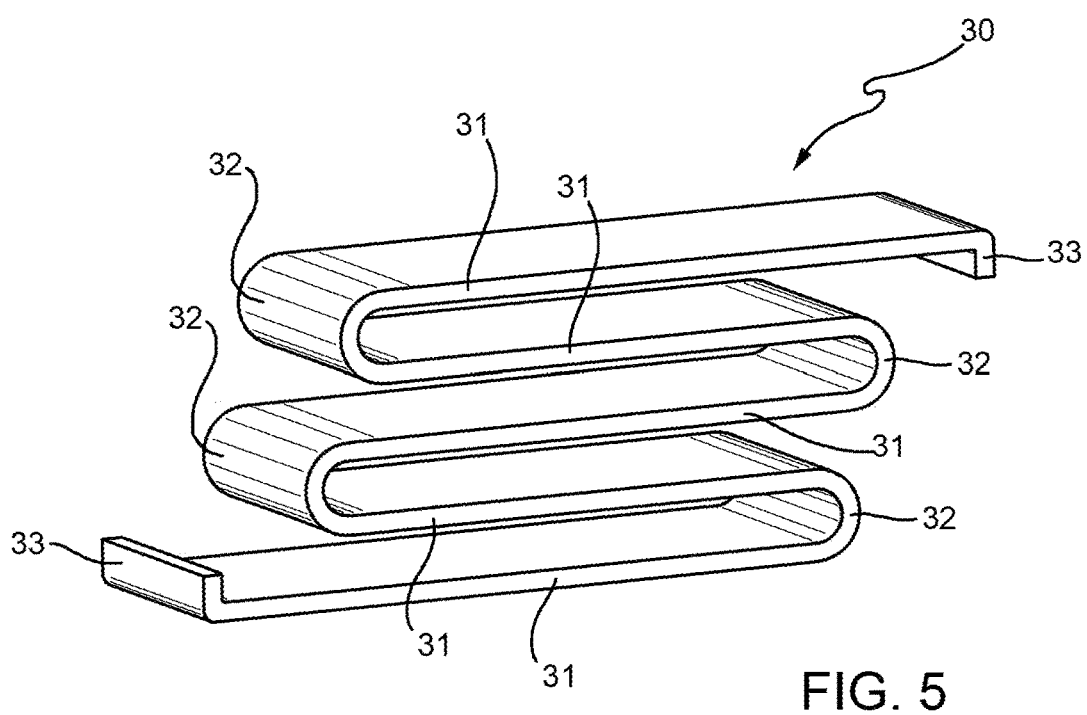
FIG. 5 shows a perspective view, on a highly enlarged scale, of a detail of the damping device in FIGS. 2 to 4.

With particular reference to FIG. 5, each spring 30 is advantageously shaped in a serpentine.

In turn, each spring 30 comprises:
a plurality of sections 31 with a mainly radial extension; and
a plurality of sections 32 with a mainly axial extension, which are interposed between two mutually consecutive sections 31.

In the case shown, sections 31 are flat and sections 32 are curved so as to join two mutually consecutive sections 31.

In addition, the radial space occupied by sections 31 is greater than the axial space occupied by sections 32.

Furthermore, each spring 30 is constrained to the mass 17 and the rod 16 at its radially free ends 33 of respective sections 31 defining opposite axial ends of the spring 30.

The shaping and method of constraining the springs 30 are such that they can be considered elastically deformable along axis A and having substantially infinite stiffness in the plane orthogonal to axis A, so that the springs 30 effectively do not cause any vibration of the mass 17 in the plane orthogonal to axis A.

Figure 2:
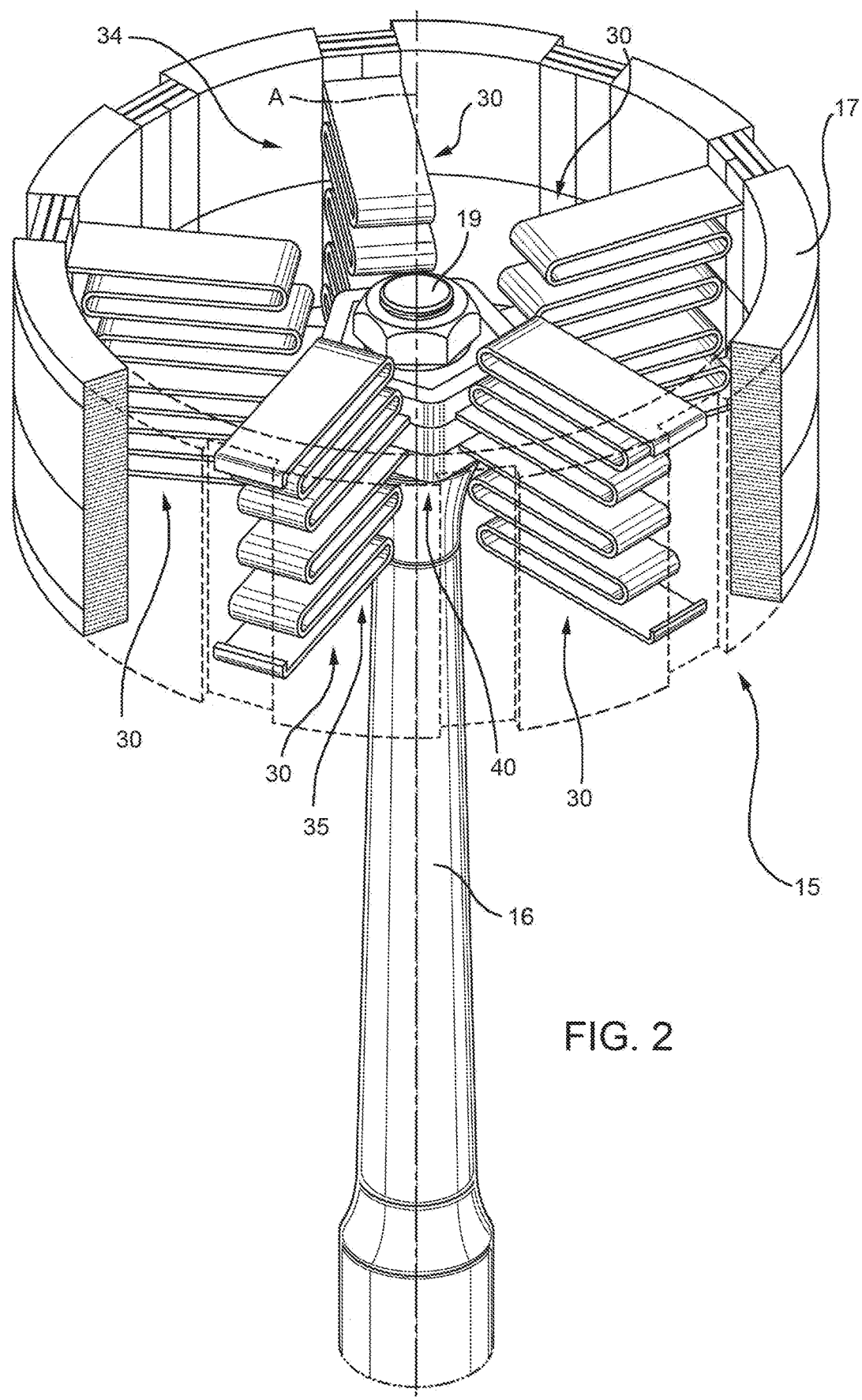
FIG. 2 shows a perspective view, on a highly enlarged scale, of a damping device housed in the rotor in FIG. 1.
Figure 4:
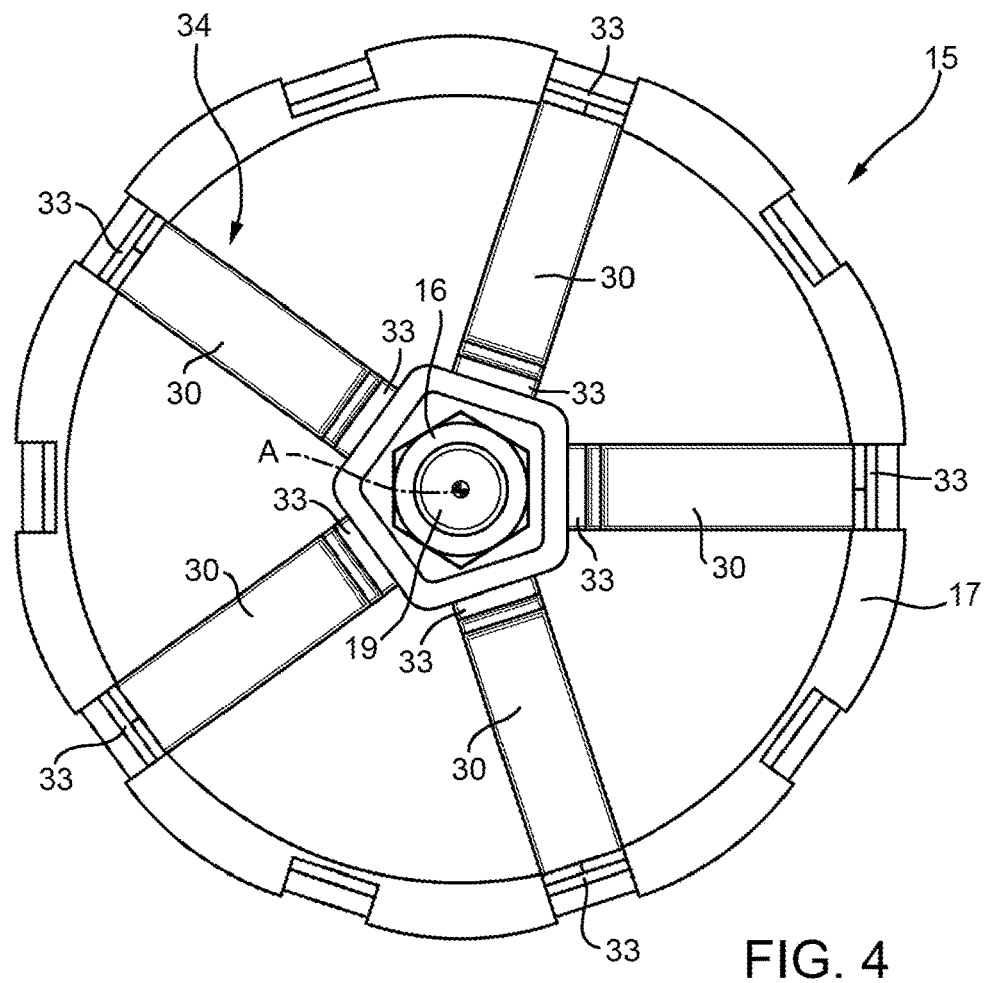
FIG. 4 is a top view of the damping device in FIGS. 2 and 3.

Referring to FIGS. 2 and 4, the mass 17 is shaped like a hollow cylinder, internally housing axial end 19 of the rod 16 and the springs 30.

More specifically, the mass 17 houses a first and a second set 34 and 35 of springs 30.

Each set 34 and 35 is formed by a plurality of springs 30, five in the case shown, angularly equi-spaced around axis A.

In particular, the number of springs 30 of each set 34 and 35 corresponds to the number of blades 9 of the rotor 3.

The sets 34 and 35 are axially superimposed on one another so that the springs 30 of set 34 are arranged in correspondence to the respective springs 30 of set 35.

The rod 16 also comprises a hub 40 located at end 19 and to which the springs 30 are connected.

The hub 40 connects the rod 16 and the mass 17 via the springs in an elastically deformable manner in the direction parallel to axis A.

Figure 3:
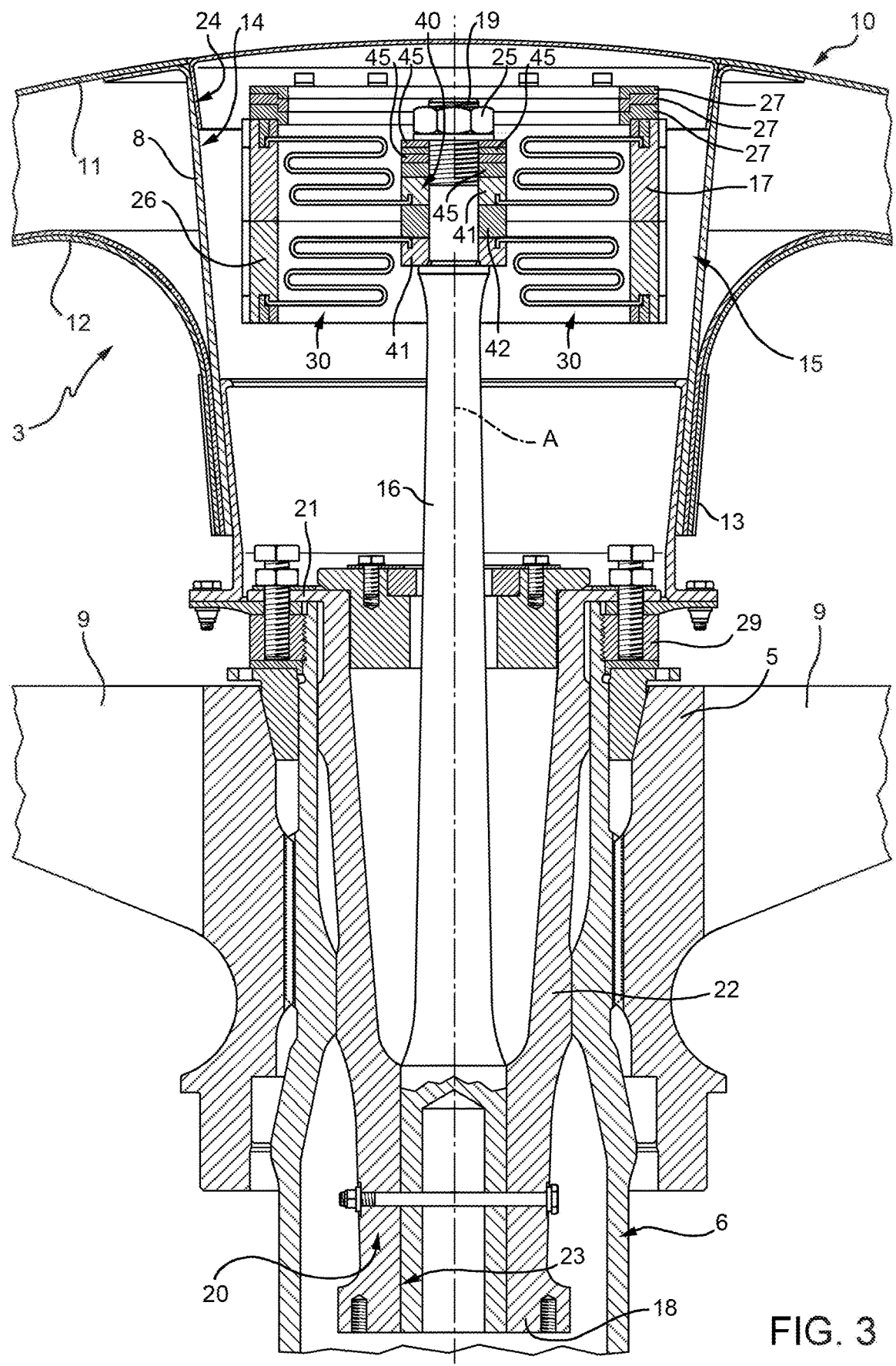
FIG. 3 shows an axial section of the rotor in FIG. 2, with parts removed for clarity.

With particular reference to FIG. 3, the hub 40 comprises:
a pair of elements 41 axially opposite to each other and to which the radially inner ends of the springs 30 of the sets 34 and 35, respectively, are fixed; and
an element 42, which is axially interposed between elements 41.

In particular, the mass 17 is made of tungsten.

In the case shown, the hub 40 is pentagonal.

The mass 17 comprises a main body 26 defining the seat 25 and a plurality of plates 27 (not visible in FIG. 2) connected in a releasable manner to the main body 26 to enable adjusting the axial vibration frequency of the mass 17 parallel to axis A, and therefore the tuning frequency of the device 15 to the N*Ω pulse rate.

The plates 27 are formed by rings coaxial to axis A, stacked on top of each other and lying on respective planes orthogonal to axis A.

Similarly, the rod 16 comprises a plurality of plates 45 (not visible in FIG. 2), connected in a releasable manner to the hub 40 and close to end 19, in order to selectively alter the flexural vibration frequency of the mass 17 in a plane orthogonal to axis A and therefore the tuning frequency of the device 15.

In use, the mast 6 drives the hub 5, the blades 9 and the device 15 in rotation about axis A.

The rotation of the hub 5 and the blades 9 generates aerodynamic loads on the blades 9 and consequent vibrations, which are transmitted to the mast 6.

Furthermore, rotation of the device 15 causes:
flexural oscillation of the mass 17 in the plane orthogonal to axis A, by virtue of the fact that the rod 16 has flexural elastic pliability, while being substantially rigid in the axial direction; and
axial oscillation of the mass 17 parallel to axis A, by virtue of the fact that the springs 30 have a desired axial stiffness, while being substantially rigid in the plane orthogonal to axis A.

In other words, the device 15 behaves substantially like an assembly comprising:
the first tuned mass damper formed by the rod 16 and the mass 17, and able of contain the transmission of flexural vibrations in the plane orthogonal to axis A to the mast 6; and
the second tuned mass damper formed by the springs 30 and the mass 17, and able of contain the transmission of axial vibrations to the mast 6.

Due to the design configuration of the rod 16, the mass 17 and the springs 30, the flexural and axial vibration frequencies of the mass 17 are such as to be tuned to the fundamental frequency of the vibrations induced by the rotation of the rotor 3, namely N*S).

Therefore, thanks to the flexural and elastic oscillations of the mass 17, the device 15 counters the transmission of the aforementioned axial and flexural vibrations to the mast 6 and, from the latter, to the fuselage 2.

The device 15 can be easily inserted inside a pre-existing rotor 3, comprising hub 5, mast 6 and blades 9, in order to upgrade the rotor 3.

To this end, it is sufficient to fix the cup-shaped body 20 to the mast 6, fix the rod 16 to the cup-shaped body 20 and, lastly, fix the mass 17 and the springs 30 to the rod 16.

Finally, the tuning frequency of the device 15 can be finely adjusted, once the device 15 has been installed aboard the helicopter 1, inside the rotor 3.

In particular, plates 27 are first added to the mass 17 to tune the device 15 to the desired axial vibration frequency of the mast 6 that it is wished to contain, equal to N*C).

Then, plates 45 are added to the hub 40 so as to tune the device 15 to the desired flexural vibration frequency of the mast 6 that it is wished to contain, equal to N*C).

It is important to stress that plates 45 adjust the flexural vibration frequency of the system formed by the rod 16 and the mass 17, but do not substantially alter the axial vibration frequency of the system formed by the springs 30 and the mass 17.

Reference number 3' in FIGS. 6 to 9 indicates a rotor according to a second embodiment of the present invention; rotor 3, 3' are similar to each other, the following description is limited to the differences between them, and using the same references, where possible, for identical or corresponding parts.

In particular, rotor 3' differs from rotor 3 in that each spring 30' comprises (FIG. 8):
 a pair of sections 31a', 31b' with a mainly radial extension; and
 a pair of sections 33a', 33b'.

In the embodiment shown, sections 33a', 33b' have a slanted extension with respect to axis A.

Sections 31a', 31b' are axially interposed between sections 33a', 33b'.

Sections 31a', 31b' comprise respective radially inner ends 35a', 35b' and radially outer ends 36a', 36b'.

Sections 33a', 33b' comprise respective radially inner ends 37a', 37b' and radially outer ends 38a', 38b'.

Each spring 30' further comprises:
 a radially inner block 60' to which ends 35a', 35b' of sections 31a', 31b' are joined; and
 a radially outer block 61' to which ends 38a', 38b' of sections 32a', 32b' are connected.

Sections 33a', 33b' comprise respective plate 62a', 62b' lying on a plane substantially orthogonal to axis A and defining respective ends 37a', 37b'.

Sections 33a', 33b' converge, in the embodiment shown, towards one another, proceeding from respective plate 62a', 62b' towards block 61'.

In the embodiment shown, sections 31a', 31b'; 33a', 33b' are defined by respective arms.

In the embodiment shown, sections 31a', 33a' are arranged above respective sections 33a', 33b'.

Each spring 30' is advantageously shaped in a serpentine, proceeding from plate 62a' to plate 62b', by section 33a', portion of block 61' at which end 38a' is joined, section 31a', block 60', section 31b', portion of block 61' at which end 38b' is joined and section 33b'.

Figure 7:
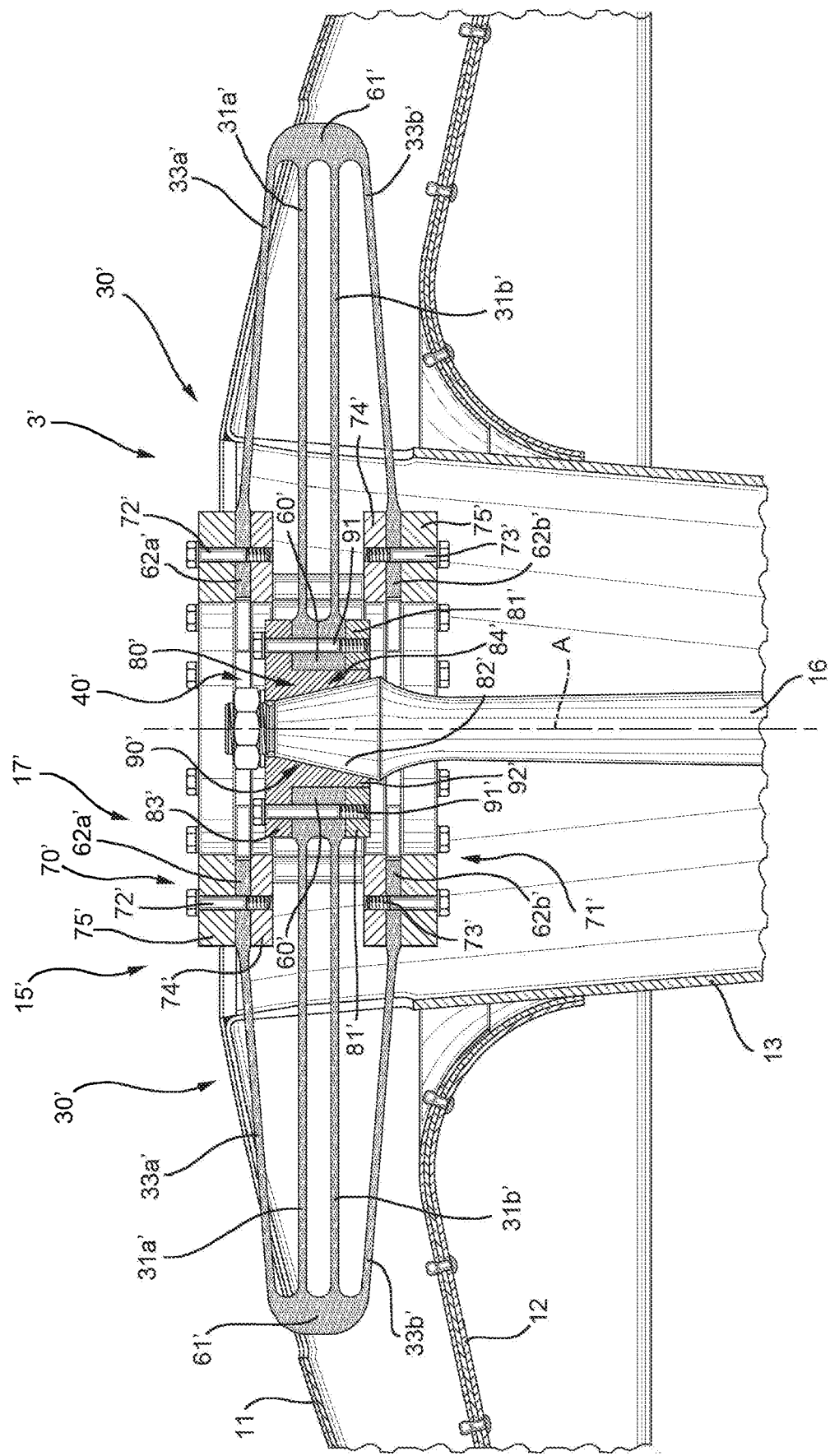
FIG. 7 shows a section of the rotor of FIG. 6 along line VII-VII of FIG. 6.
Figure 8:
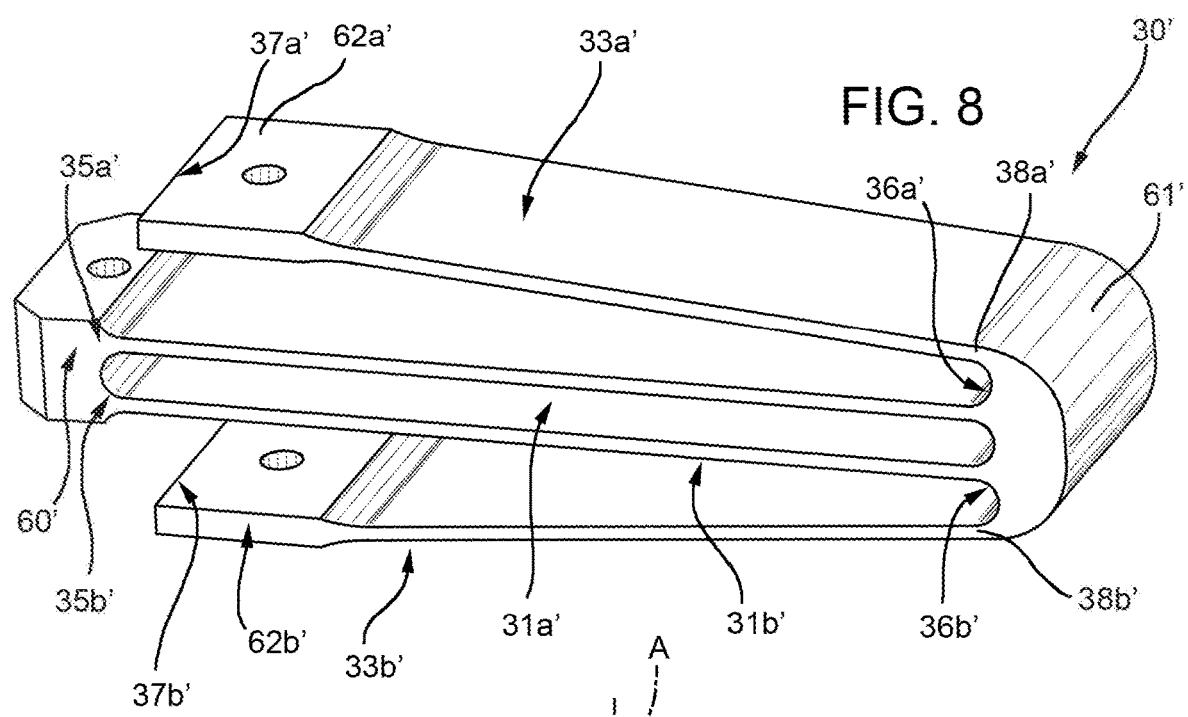
FIG. 8 shows a perspective view, on a highly enlarged scale, of a detail of the damping device of FIGS. 6 and 7.

With reference to FIG. 7, mass 17' differs from mass 17 for comprising:
 a ring 70' to which plates 62a' of sections 33a' are connected, by means of bolts 72' in the embodiment shown; and
 a ring 71' to which plates 62b' of sections 33b' are fitted, by means of bolts 73' in the embodiment shown.

In particular, each rings 70', 71' is formed by two respective sub-rings 74', 75', which are connected by respective bolts 72', 73'.

Sub-rings 74' are axially interposed between sub-rings 75'.

Plates 62a', 62b' of respective sections 33a', 33b' are sandwiched between sub-rings 74', 75' of respective rings 70', 71'.

Figure 9:
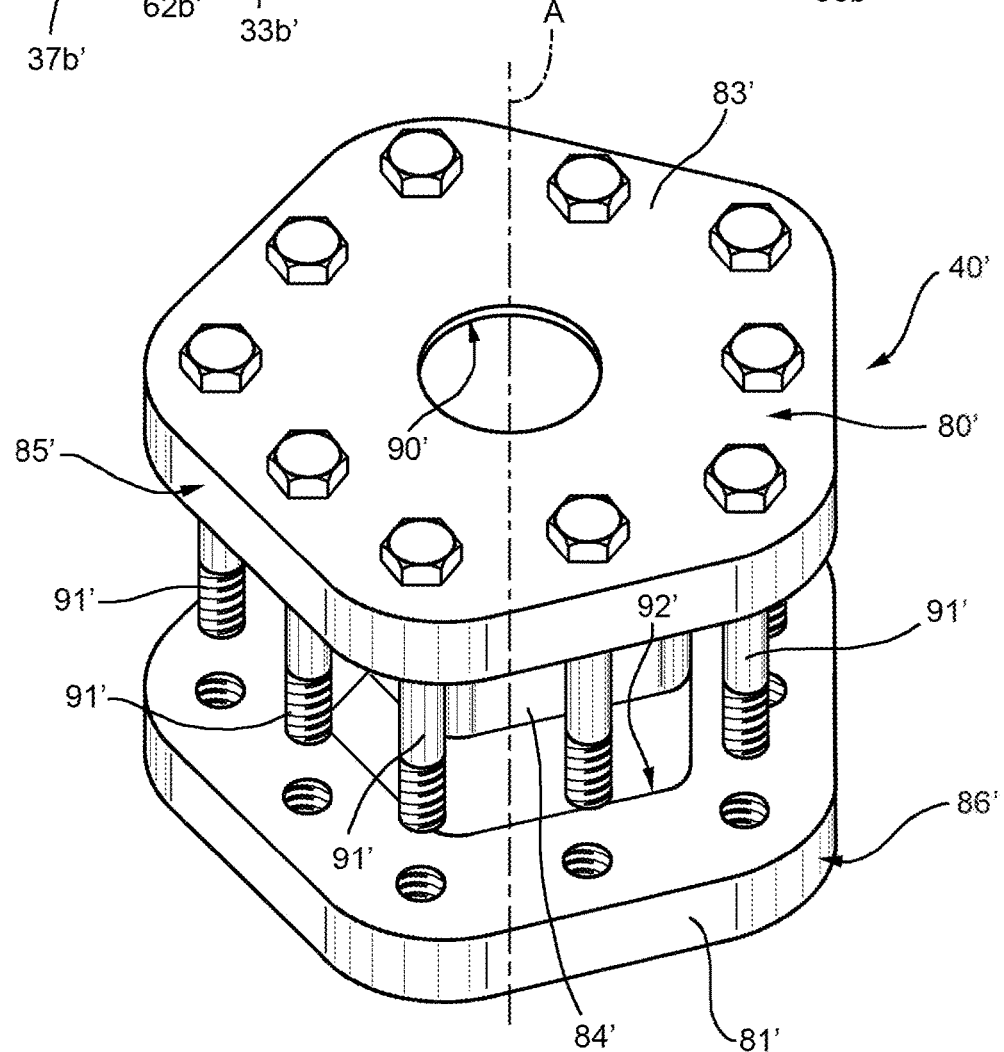
FIG. 9 shows a perspective view, on an enlarged scale, of a further detail of the damping device of FIG. 8.

With reference to FIG. 9, hub 40' differs from hub 40 for comprising:
 a hollow element 80' defining a conical contact surface 90' housing an end 82' of rod 16; and
 a hollow flange 81' rotationally coupled to element 80'.

Element 80' integrally comprises a flange 83' lying on a plane orthogonal to axis A and a hollow body 84' extending parallel to axis A from element 80' towards flange 81'.

Flange 81' lies on a plane orthogonal to axis A and is axially spaced from flange 83' parallel to axis A.

In the embodiment shown, element 80' and flange 83' have a polygonal radially outer contour 85' with respect to axis A, pentagonal in the embodiment shown.

Contour 85' of flange 83' engages a polygonal through seat 92' defined by the radially inner contour of flange 81'. In this way, element 80' and flange 81' are rotationally integral through a shape coupling.

Seat 90' is frusto-conical shaped and tapers proceedings from flange 81' towards flange 83'.

Flange 81' has polygonal radially outer contour 86' with respect to axis A, pentagonal in the embodiment shown.

Flange 83' lies on a plane orthogonal to axis A and surrounds body 84'.

As shown in FIG. 7, block 60' of each spring 30' is axially sandwiched between flanges 81', 83' of hub 40'.

Flanges 81', 83' are releasably connected with one another by means of a plurality of bolts 91' extending parallel to axis A.

Figure 6:
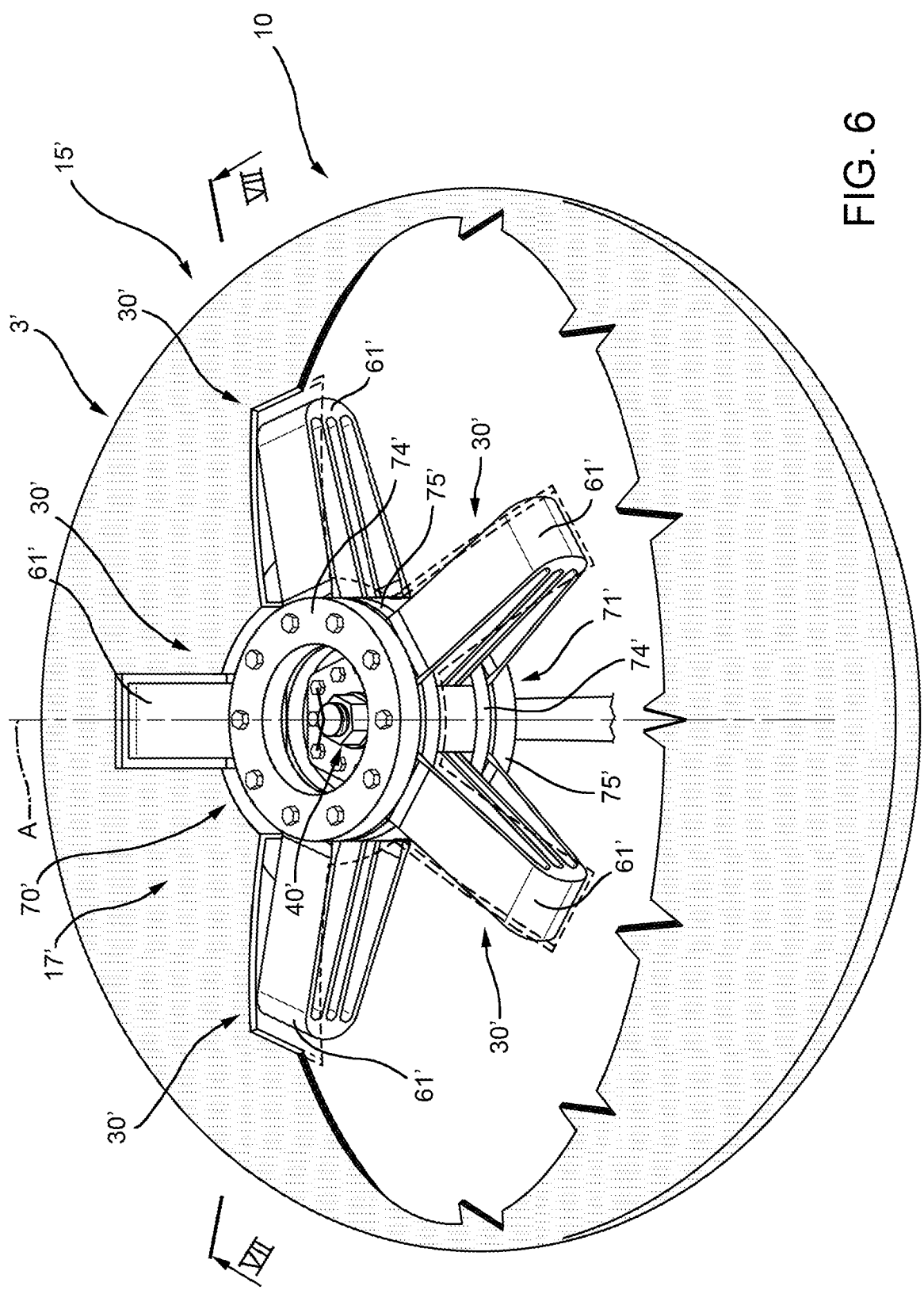
FIG. 6 shows a perspective view of a damping device housed in a rotor according to a second embodiment of the present invention.

With reference to FIG. 6, springs 30', hub 40' and mass 17' are housed in flow conveyor 10.

The operation of rotor 3' and the adjustment of the tuning frequency of device 15' is substantially identical to the one of rotor 3' and device 15' and are therefore not descried in detail.

From examination of the rotor 3, 3' and the method according to the present invention, the advantages that can be achieved therewith are evident.

In particular, the device 15, 15' comprises the springs 30, 30' which have a desired stiffness along axis A and are connected to the mass 17, 17'.

In this way, the mass 17, 17' can elastically oscillate parallel to axis A, thereby containing the transmission of axial vibrations parallel to axis A to the mast 6.

Moreover, the mass 17, 17' is also free to oscillate in the plane orthogonal to axis A and elastically connected to the rod 16 having a desired value of axial stiffness.

Thus, the device 15, 15' uses the same mass 17, 17' as a "moveable element" to contain the transmission of both flexural vibrations and axial vibrations to the mast 6.

In other words, the same mass 17, 17' is both part of the first tuned mass damper together with the rod 16 and part of the second tuned mass damper together with the springs 30, 30'.

Furthermore, the device 15, 15' uses the same rod 16 to connect both the flexural tuned mass damper, formed by the mass 17, 17' and the rod 16, and the axial tuned mass damper, formed by the mass 17, 17' and the springs 30, 30' to the mast 6.

It follows that the device 15, 15' is particularly compact and takes up little space, making integration in the rotor 3 possible without unduly altering the design of latter.

The applicant has also noted that thanks to their serpentine configuration, the springs 30, 30' have a constant stiffness and therefore a substantially linear elastic behaviour.

In particular, springs 30', due to the presence of blocks 60', 61' have an optimal stiffness in the plane orthogonal to axis A, an optimal stretchiness parallel to axis A, and is capable to efficiently sustain fatigue loads due to the operation of rotor 3, 3'.

In addition, as the device 15, 15' is housed inside the bay 24, it is not subjected to aerodynamic forces that might prevent the device 15, 15' tuning to the aforementioned frequency value characteristic of the vibrations generated by rotation of the rotor 3, 3'.

Finally, the device 15, 15' is easily incorporated in the rotor 3, 3', as it is housed in the bay 24 and is therefore not intrusive with respect to the other components of the rotor 3, 3'.

The method of upgrading according to the invention is particularly advantageous, as it does not require modifying a pre-existing rotor 3, 3' to create new housings for the device 15, 15'.

In fact, to this end, it is sufficient to fix the cup-shaped body 20 to the mast 6, fix the rod 16 to the cup-shaped body 20, and fix the springs 30, 30' to the rod 16 and the mass 17, 17' to the springs 30, 30'.

Finally, the tuning frequency of the device 15, 15' can be easily adjusted once the device 15 has been installed in the rotor 3, 3' so as to take into account the effective value of the rotation speed Ω of the mast 6.

To this end, it is sufficient to first add some plates 27 to the mass 17, 17' to tune the device 15, 15' to the desired axial vibration frequency of the mast 6, and then add some plates 45 to the hub 40, 40' to tune the device 15, 15' to desired flexural vibration frequency of the mast 6 that it is wished to contain.

Finally, it is obvious that modifications and variants can be made regarding the rotor 3, 3' and the method described and illustrated herein without departing from the scope of protection defined by the claims.

Sections 33a', 33b' could radially extend with respect to axis A.

The helicopter 1 could also be a convertiplane.

The invention claimed is:

1. A rotor for a hover-capable aircraft, comprising: a hub rotatable about a first axis (A) and, in turn, comprising a plurality of blades;
   a mast connectable to a drive member of said aircraft and operatively connected to said hub to drive the hub in rotation about said axis (A); and
   damping means to dampen the transmission of vibrations to said mast, which comprise a mass designed to oscillate, in use, in a plane transversal to said axis (A) so as to contain, in use, the flexural vibrations of said mast generated by rotation of the blades;
   said damping means further comprising a plurality of springs possessing a desired stiffness along said axis (A) and operatively connected to said mass to contain, in use, the vibration of said mast along said axis (A);
   said damping means further comprising a rod supported by said mast and designed to flexurally oscillate in a plane transversal to said axis (A);
   said rod extending along said axis (A);
   said plurality of springs also being interposed between said mass and said rod;
   characterized in that said plurality of springs comprise at least one spring that has a serpentine-like shape, having a plurality of first sections extending mainly radially with respect to said axis (A) alternating with a plurality of second sections extending mainly parallel to said axis (A).

2. The rotor according to claim 1, characterized in that a radial extension of each said first section is greater than an axial extension of each said second section.

3. The rotor according to claim 1, characterized in that said plurality of springs comprises a first set of springs angularly equi-spaced with respect to said axis (A).

4. The rotor according to claim 3, characterized in that said plurality of springs comprises a second set of springs, which are angularly equi-spaced with respect to said axis (A);
   each spring of said first set of springs being axially superimposed on a respective spring of said second set of springs.

5. The rotor according to claim 3, characterized in that the rotor comprises a hub angularly integral with said rod and fitted on an axial end of said rod and on which said plurality of springs are fixed.

6. The rotor of claim 5, characterized in that by further comprising a further hub interposed between said rod and said plurality of springs;
   each spring of said plurality of springs comprising a radially inner end block at which said at least one second arm is fitted; said radially inner end block being connected to said further hub;
   said radially inner end block being connected to said rod.

7. The rotor of claim 6, characterized in that said further hub comprises a first flange and a second flange axially spaced with one another and through which said radially inner end of said at least one first arm is sandwiched.

8. The rotor of claim 7, characterized in that said further hub comprises a body axially protruding from said first flange on the side of said second flange and engaged inside a first seat defined by said second flange.

9. The rotor of claim 8, characterized in that said first flange and said body define a second seat engaged by said rod.

10. The rotor of claim 9, characterized in that said second seat is conical, and/or said first seat is polygonal.

11. The rotor of claim 9, characterized in that said body has a radially outer polygonal contour engaging said first seat defined by said second flange;
    said first seat having a radially inner polygonal contour.

12. The rotor of claim 11, characterized in that said plurality of springs prevalently extends on the radially outer side of said mass.

13. The rotor according to claim 1, characterized in that said at least one spring comprises a pair of second axial end sections at free ends of said at least one spring, opposite to each other and with one fixed to said mass and the other fixed to said rod.

14. The rotor according to claim 1, characterized in that said mass is hollow and in that said plurality of springs are housed inside said mass.

15. The rotor according to claim 1, characterized in that said mass and said plurality of springs form a first tuned mass damper having a first natural frequency, and in that said mass and said rod form a second tuned mass damper having a second natural frequency equal to said first natural frequency.

16. The rotor according to claim 1, characterized in that each spring of said plurality of springs comprises:
    at least one first arm fitted to said rod; and
    a pair of second arms fitted to said mass;

said first arm being axially interposed between said second arms.

17. The rotor of claim 16, characterized in that said each spring of said plurality of springs comprises a radially outer end block at which said first arm and said second arms are joined.

18. The rotor of claim 17, characterized in that said mass comprises a first ring and a second ring axially spaced with respect to another and to which are fitted respective second arms.

19. The rotor of claim 18, characterized in that said first ring comprises a pair of first sub-rings between which a first radially inner end of one of said second arms is axially sandwiched;
said second ring comprising a pair of second sub-rings between which a second radially inner end of the other one of said second arm is axially sandwiched.

20. The rotor of claim 16, characterized in that said first arm radially extends with respect to said axis (A); and/or characterized in that said at least one second arm is, at least in part, radially slanted with respect to said axis (A).

21. The rotor of claim 1, characterized by comprising a flow conveyor housing said damping means.

22. A hover-capable aircraft, characterized in that the hover-capable aircraft comprises a rotor according to claim 1.

23. A rotor for a hover-capable aircraft, comprising:
a hub rotatable about a first axis (A) and, in turn, comprising a plurality of blades;
a mast connectable to a drive member of said aircraft and operatively connected to said hub to drive the hub in rotation about said axis (A); and
damping means to dampen the transmission of vibrations to said mast, which comprise a mass designed to oscillate, in use, in a plane transversal to said axis (A) so as to contain, in use, the flexural vibrations of said mast generated by rotation of the blades;
said damping means further comprising a plurality of springs possessing a desired stiffness along said axis (A) and operatively connected to said mass to contain, in use, the vibration of said mast along said axis (A), said vibration also being generated by the rotation of the blades;
said damping means further comprising a first elastic element supported by said mast and designed to flexurally oscillate in a plane transversal to said axis (A);
said rod extending along said axis (A);
said elastic means also being interposed between said mass and said rod;
characterized in that said plurality of springs comprise at least one spring that comprises:
at least one first arm fitted to said first elastic element; and
a pair of second arms fitted to said mass;
a radially outer end block joined to said rod and at which said first arm and said second arms are joined; and
a radially outer end block at which said first arm and said second arms are joined;
said radially inner end block being connected to said rod.

24. A method for the containment of vibrations transmitted to a mast of a rotor of an aircraft;
said rotor comprising:
a hub rotatable about an axis (A) and, in turn, comprising a plurality of blades;
said mast, which is connectable to a drive member of said aircraft and operatively connected to said hub to drive the hub in rotation about said axis (A);
said method comprising the steps of:
i) connecting a first mass to said mast in a manner free to oscillate in a plane transversal to said axis (A) so as to contain the flexural vibrations of said mast;
ii) connecting a plurality of springs having a desired stiffness along said axis (A) to said mass, so as to contain the vibration of said mast along said axis (A);
iii) connecting a rod designed to oscillate in a plane transversal to said axis (A) and supported by said mast to said mass; and
iv) connecting said first mass to said rod;
said plurality of springs comprises at least one spring with a serpentine-like shape, having a plurality of first sections extending mainly radially with respect to said axis (A) alternating with a plurality of second sections extending mainly parallel to said axis (A).

25. The method according to claim 24, further comprising the steps of:
v) selectively adding further second masses to said first mass to tune the vibration frequency of said first mass parallel to said axis (A) to a desired value; and
vi) selectively adding further third masses to said rod to tune the vibration frequency of said first mass transversely to said axis (A) to said desired value.

26. The method according to claim 25, characterized in that said step v) is performed before said step vi).

27. A method for the containment of vibrations transmitted to a mast of a rotor of an aircraft;
said rotor comprising:
a hub rotatable about an axis (A) and, in turn, comprising a plurality of blades;
said mast, which is connectable to a drive member of said aircraft and operatively connected to said hub to drive the hub in rotation about said axis (A);
said method comprising the step of:
i) connecting a first mass to said mast in a manner free to oscillate in a plane transversal to said axis (A) so as to contain the flexural vibrations of said mast;
characterized in that it comprises the steps of:
ii) connecting a plurality of springs having a desired stiffness along said axis (A) to said mass, so as to contain the vibration of said mast along said axis (A);
iii) connecting a rod designed to oscillate in a plane transversal to said axis (A) and supported by said mast to said mass; and
iv) connecting said first mass to said rod;
said plurality of springs comprising at least one spring that comprises
at least one first arm fitted to said rod; and
a pair of second arms fitted to said mass;
a radially outer end block joined to said rod and at which said first arm and said second arms are joined; and
a radially outer end block at which said first arm and said second arms are joined;
said radially inner end block being connected to said rod.

* * * * *